United States Patent
Glass

[15] 3,703,209
[45] Nov. 21, 1972

[54] ADJUSTABLE BOOT TYPE COMPOSITION HORSESHOE

[72] Inventor: Neel W. Glass, Los Alamos, N. Mex.
[73] Assignee: Les-Kare, Inc., Pajarito Acres, N. Mex.
[22] Filed: Nov. 27, 1970
[21] Appl. No.: 93,119

[52] U.S. Cl. ..................168/18, 168/4, 168/DIG. 1
[51] Int. Cl. ..............................A011 3/00, A011 5/00
[58] Field of Search................168/2, 3, 18, 22, 19, 4; 36/2.5 AL, 2.5 P, 7.1, 7.3; 24/68, 69, 70

[56] References Cited

UNITED STATES PATENTS

| | | | |
|---|---|---|---|
| 152,975 | 7/1874 | Dean | 168/4 |
| 519,047 | 5/1894 | Rogers | 168/2 |
| 810,849 | 1/1906 | Egger | 168/22 |
| 3,486,561 | 12/1969 | Kulak | 168/4 |
| 1,689,000 | 10/1928 | Wagner | 36/7.3 |
| 2,861,310 | 11/1958 | Martin | 24/68 SK |
| 2,041,538 | 5/1936 | Gash et al. | 168/4 |
| 513,360 | 1/1894 | Covell | 168/22 |
| 3,236,310 | 2/1966 | Quick | 168/18 |
| 3,491,465 | 1/1970 | Martin | 36/2.5 AL |
| 3,577,602 | 5/1971 | Speichinger | 24/70 SK |

FOREIGN PATENTS OR APPLICATIONS

| | | | |
|---|---|---|---|
| 1,408,646 | 7/1965 | France | 24/68 SK |

Primary Examiner—Aldrich F. Medbery
Attorney—Henry Heyman

[57] ABSTRACT

A molded composition boot type horseshoe having a tread portion shaped to cover the entire bottom of a horse's hoof and a flexible upwardly extending envelope portion shaped to conform to the lateral walls of a horse's hoof and having a pair of triangular folds in the front portion to provide contractual flexibility, and an adjustable tensioning member being a continuous flexible cable which is fastened at the ends to opposite sides of the upper part of the envelope portion and an over center tensioning means secured to the front part of the envelope portion for engagement with the flexible cable for snugging the shoe securely to the downwardly expanding portion of the hoof whereby the horseshoe is firmly urged upward and affixed to the hoof by distributed pressure against the aforesaid downward expanding portions of the hoof, the back of the horse's foot and the sole of the hoof.

4 Claims, 4 Drawing Figures

PATENTED NOV 21 1972 3,703,209

INVENTOR
Neel W. Glass

ADJUSTABLE BOOT TYPE COMPOSITION HORSESHOE

This invention relates to a novel and useful horseshoe and more specifically to a molded horseshoe which eliminates the need for frequent expensive shoeing of the metal type and which provides needed protection to the horse's hoof.

The horse is today usually a riding animal for recreational purposes. It is frequently driven on paved paths as well as stony horse trails. It is often confined to the stable or barnyard for extended periods at a time. It is most often used by younger members of a family. Some form of protection is needed for the horse's hooves but the frequent fitting and securing of the old fashioned metal horseshoe by a farrier is expensive and inconvenient because the village blacksmith is practically extinct. In addition, even when available and fitted, metal shoes wear out quickly when used on pavements and are dangerously slippery when the pavement is slick with moisture, snow, or ice. When the horse is used as a recreational animal by young and inexperienced persons the metal shoe is dangerous in the event of a kick and is very likely to cause serious bodily harm such as skull fractures. Nevertheless, the horse's hoof must be protected to prevent injury to the horse and to provide effective traction for the horse's hoof.

Various types of composition horseshoes have hitherto been proposed to substitute for the metal shoe and most of them include a flexible sole portion and a flexible envelope for gripping the upper part of the horse's shoe.

In one form of composition horseshoe such as that disclosed in U.S. Pat. No. 1,218,901 to Saxton dated Mar. 13, 1917, the composition horseshoe is provided with slots in the upper portion and a continuous metal clampband 6 is tensioned around the shoe by a bolt 8. The provision of the slots is not a desirable feature because mud and moisture will be admitted and render the horse's hoof subject to grinding erosion and rot. The metal band, inasmuch as it surrounds the shoe, causes a constriction on the horse's foot at a location which, as will later become apparent, will damage the ligaments in the foot in addition to impairing circulation. The continuous clamping band is not effective in snugging the back part of the shoe upward so that the shoe may shift and constantly work and wear against the hoof as well as to deteriorate due to flexed portions being unsupported.

Another prior art horseshoe of resilient material is shown in U.S. Pat. No. 2,041,538 to Gash et al. dated May 19, 1936. However, this shoe is retained on the horse's hoof by a tight elastic fit at the upper portion of the shoe and, as will be seen, any concentrated constrictive band around the upper part of the horse's foot results in restricting or cutting off circulation of blood in the foot and tends to cause other serious and permanent damage to the horse.

Still another prior art horse boot or shoe is shown by U.S. Pat. No. 759,636 to Ryan dated May 10, 1904. The patentee does not provide for the necessary loosening of the upper portion when unbuckled to permit easy application nor is ventilation of the hoof provided for when the shoe is secured.

The main object of the present invention is to provide a shoe for a horse's hoof which will make the nail anchored shoes unnecessary while meeting the anatomical needs of the horse.

Another object of the present invention is to provide a horseshoe which does not shift or work on the hoof, which can be applied quickly and easily, which prevents mud or water from working into the shoe, provides ventilation to the hoof, and is designed to be compatible with the anatomy of the horse's foot.

Still another object is to provide a simple but effective buckle device which reduces to a minimum the time and effort required to put on the shoes.

Yet another object of this invention is to provide a composition horseshoe which is reliably secured in place by an arrangement which takes into account the tapered shape of the hoof and avoids constriction of the blood vessels and tendons of the horse's foot.

These, together with other objects and advantages which will subsequently become apparent, reside in the details of the construction, arrangement and combination of the several parts and features as more fully hereinafter described and claimed, reference being had to the accompanying drawings made a part hereof, wherein like numerals refer to like parts throughout, and in which:

Figure 1:
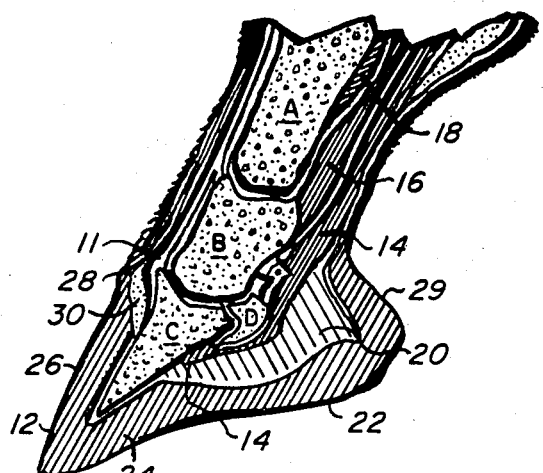
FIG. 1 is a fore and aft cross section of a horse's foot to show the anatomy thereof.

The anatomical factors to be considered in providing an overshoe for a horse's foot are explained with reference to FIG. 1. The horse's foot is effectively the extremity of a single digit supported in a horny housing. The main bones of the foot are the first phalanx A, second phalanx B, third phalanx C and distal sesamoid bone D. The bones are flexibly connected by lubricated joints and ligaments. The phalanges are at an appreciable angle to the metacarpal bone so that the foot bones with the ligaments and muscles extending at an angle of 30° or so from the upper portion of the leg provide a shock absorbing mechanism as well as adaptability to uneven terrain.

Much of the muscle controlled structure extends almost to the bottom of the hoof. The upper front portions of phalanx C and phalanx B are connected to tendon 11 of the common extensor for rotating the front of hoof 12 upward. Attached to the back side of phalanx C is the deep flexor tendon 14. Attached to the upper portion of the back of phalanx B is the end of the heavy superficial sesamoidean ligament 16. The first phalanx A also is attached to ligaments, one to the top front (not shown) and the middle sesamoidean ligament 18 at the middle of the back portion.

The hoof and foot are further constructed to provide cushioning as by the digital cushion 20. The bottom of the hoof cavity is closed by the frog 22 and at the forward part by the sole 24 of the hoof. The hoof material is exuded by extremely vascular end portions of the skin. The enlarged ring like structure at the top of the hoof in front, the coronary cushion 28, and the coronary corium contribute most to the generation of the horny hoof material.

Figure 2:
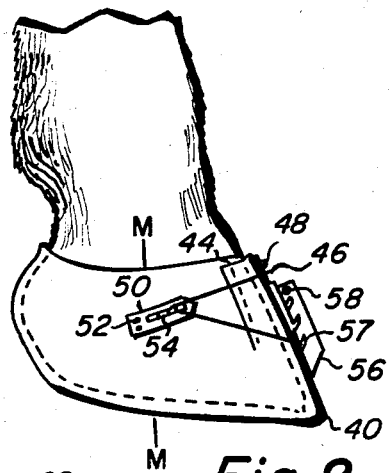
FIG. 2 is a side elevation of the flexible horseshoe of the present invention in place on a horse's foot.
Figure 4:
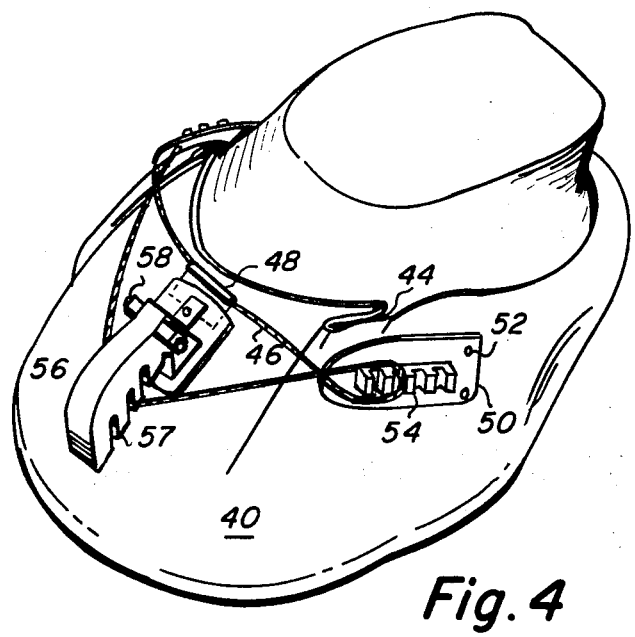
FIG. 4 is a front corner perspective of the horseshoe of the present invention buckled in place on a horse's hoof.

From the foregoing it is demonstrated that the construction and operation of the horse's foot are complex and that motion of the internal parts must not be impeded and reduced circulation by constriction must be avoided. The front, sides, and sole portion do, however, effect a strong box so that advantage can be taken of the rigidity and shape of the hoof to provide anchorage for an enveloping shoe without involving any part of the horse's foot on or above the coronary cushion. In particular, the angle of the front part 26 of the hoof slopes in an opporture direction. This angle averages between 47° and 48° on the fore foot and 54° to 55° on the hind foot. At the mean position M—M of FIG. 2 between the tip of the hoof and the heel the angle is adverse, being inclined outward on the front foot at 101° to 102° and 96° to 97° on the rear foot. The upper one-third of the foot at the median position curves inwardly at about 10° to 15°. At the back of the foot advantage is taken of the protruding cartilage 29. The shoe is molded in an exact shape which closely approximates the horse's foot to avoid concentrated pressure on the rear portion of the foot or on the coronary cushion. Referring to FIGS. 2 and 4, it is seen that each lateral wall is joined to the front wall proximate the bottom thereof by a smooth continuation zone and above this zone it is provided with an upwardly diverging triangular flap or fold 44 having an inner and an outer wing which joins each lateral wall to the front to provide adjustability in snugging the walls against the foot. A flexible cable or tensile element 46 is fastened at its center to the upper front portion of the shoe by bracket 48. On opposite sides of the shoe an elongated bracket 50 is fastened to the outer surface of the forward portion of the side walls in any suitable manner such as by rivets 52. A plurality, such as five recesses provide hooks 54 spaced along the direction of elongation on each bracket to permit looping the cable therein and to provide a binder loop portion 46 for engagement with elongated over-center toggle 56. The pivoted toggle 56 is provided with a plurality of hooks or slots 57 on its underside which are spaced along its direction of elongation and which is hingedly supported on pin 58 so that it can be turned to an up position. Due to the inclination of the front part of the shoe, the toggle hooks 57 are closer to brackets 50 in this position than when turned down. A suitable toggle hook is chosen from the plurality present so that when the toggle is turned down, the lateral walls of the shoe engage the horse's foot firmly.

The particular arrangement of the hardware and the tensioning cable 46 shown more particularly in FIG. 4 provides eminently suitable binding of the entire shoe. The upper loop directly applies constrictive force to the front and lateral walls of the shoe and the lower loop applies constrictive force to the front wall over the inclined anterior part of the hoof thereby engaging the hoof firmly with the walls and sole.

Figure 3:
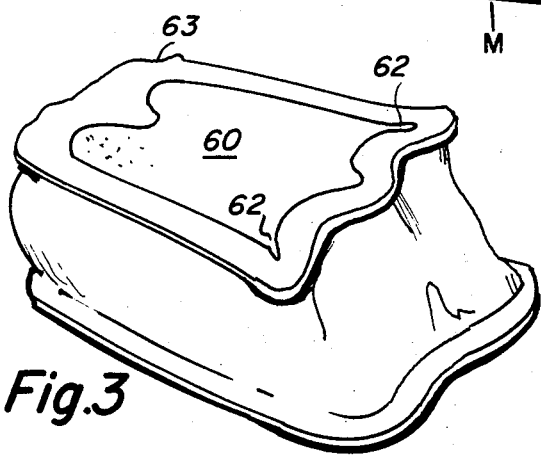
FIG. 3 is a perspective view of mold cast and mold.

The horseshoe of the present invention is preferably made from urethane materials. One process found to be successful in as follows:

A plaster blank or mold 60 is shaped and modeled to the desired outside configuration of the horse's foot as shown in FIG. 3 except with one difference; a protrusion 62 is provided on each lateral wall near the front. These short radius curved protrusions will permit reentrant flats or folds to be molded in the shoe and which provide the upwardly diverging triangular fold between the side wall and the front wall as shown in FIG. 4. A flexible RTV silicone rubber mold material which is a viscous liquid before cure is coated on the plaster mold. After the silicone rubber sets and is cured by heat, it is stripped off the mold. The urethane material is of the two component type and is mixed in proper proportion and is painted onto the inside surface of the RTV mold in successive layers to build up the desired thickness. The sole portion is next poured into the mold in a quantity sufficient to obtain the desired sole thickness. Coarse abrasive particles, when desired to provide an additional antislip quality to the shoe, are sprinkled on the inside of the shoe sole when the urethane is partially hardened. The urethane shoe 40 is next cured, still in the RTV mold, at 212° F for 16 hours. It is then cooled and the rubber mold is stripped off.

The edges are then trimmed and the hardware attached. On a mass production basis the shoes can be injection molded using known commercial methods.

The foregoing is considered as illustrative only of the principles of the invention. It is obvious that any suitable plastic composition may be used and that the hardware may be modified without departing from the essential features as above described and illustrated.

What I claim as new is as follows:

1. A removable molded urethane type composition horseshoe comprising an integral sole and generally upwardly extending front, side and rear walls; the front wall extending in a rearwardly inclined slope from the juncture with the front of the sole to the top of the horseshoe at an angle substantially equal to that of a horse's hoof, and the top of the horseshoe terminating at a level proximate to the lower boundary of the coronary cushion zone of the horse's foot, a rear wall shaped to conform to the posterior shape of a horse's foot and being integral with the side walls and the sole, the front portion of each of the side walls being joined to each of the lateral boundaries of the front wall by a smooth continuation proximate the sole and by an upwardly diverging triangular fold extending from the smooth continuation zone to the top of the horseshoe, the fold having an outer wing and an inner wing, the outer wing being molded integral with the front boundary of the respective side wall and the inner wing being molded integral with the adjacent boundary portion of the front wall of the horseshoe; a manual tensioning member tightening device affixed to the front wall of the horseshoe, side brackets each having tensioning member hooks affixed to the outer surface of each of the side walls of the horseshoe, a continuous flexible cable type tensioning member, means affixing a portion of the tensioning member to the outside surface of the top portion of the front wall, said tensioning member having a preselected length and being adapted to engage the side bracket hooks and the manual tensioning member tightening device whereby a tightening manipulation of the manual tightening member tightening device adjusts the amount of lap in the triangular folds to thereby contract the volume within the horseshoe to firmly engage the horseshoe with generalized diffused pressure against the horse's foot below the coronary cushion.

2. The removable horseshoe of claim 1 in which coarse abrasive is molded in the upper strata of the inside of the sole portion and partially extends outwardly from the surface thereof to provide frictional engagement with the horse's hoof.

3. The removable horseshoe of claim 1 in which the side brackets are affixed in a position on said side walls which lies on a plane which extends in a direction generally from the point of fixation of the tensioning member on the front wall to the lower rear of the shoe and in which the continuous tensioning member posses in a downwardly inclined direction from the point of fixation to the underside of the side bracket hooks and through selected ones of said hooks to the upper side of the hooks and from thence upwardly to the manual tensioning device when the same is in unclamped condition and to a crossed over downward position when the manual tensioning device is in tightened position; said manual tensioning device being an over center toggle clamp pivotably supported by a horizontal pivot affixed to the upper portion of the front wall of the horseshoe for pivotal rotation in a vertical plane, said toggle clamp having at least one tensioning member hook in its underside, whereby the manual manipulation of the toggle clamp from open to clamped position is provided with a mechanical advantage of at least a factor of two in reducing the volume inside the shoe to grip the horse's foot and whereby the crossed over configuration of the tensioning member when the toggle clamp is clamped provides a distributed snugging tension throughout all the walls and sole of the horseshoe along with a distributed inward pressure against the front wall of the horseshoe.

4. The removable horseshoe of claim 1 in which in the unclamped condition of the horseshoe the outer wing of the upwardly diverging triangular fold is joined with the adjacent side wall by a molded reentrant short radius sharp curve first junction approximating a 180° angle opening toward the inside of the horseshoe and the other wing of the triangular fold is joined with the adjacent boundary portion of the front of the shoe is a molded rounded broad curve of approximately 90° and opening outward from the front of the shoe whereby upon contraction of the horseshoe on a horse's foot, the short radius curve localizes the first junction fold position and the long radius curve allows the inner fold position to move to locate itself to allow the triangular folds, the front portion of the side walls, and the front wall of the shoe to lie flat against the front wall of the horse's hoof.

* * * * *